US008732531B2

(12) United States Patent
Nakai

(10) Patent No.: US 8,732,531 B2
(45) Date of Patent: May 20, 2014

(54) INFORMATION PROCESSING APPARATUS, METHOD OF CONTROLLING INFORMATION PROCESSING APPARATUS, AND CONTROL PROGRAM

(75) Inventor: Jinsuke Nakai, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 219 days.

(21) Appl. No.: 12/893,426

(22) Filed: Sep. 29, 2010

(65) Prior Publication Data
US 2011/0078520 A1 Mar. 31, 2011

(30) Foreign Application Priority Data

Sep. 30, 2009 (JP) ................................. 2009-226767

(51) Int. Cl.
*G06F 11/00* (2006.01)
(52) U.S. Cl.
USPC ............................ 714/38.11; 714/48; 714/54
(58) Field of Classification Search
USPC ...................................................... 714/38.11
See application file for complete search history.

(56) References Cited

U.S. PATENT DOCUMENTS

| 6,182,243 | B1 * | 1/2001 | Berthe et al. ................ 714/38.11 |
| 6,629,267 | B1 * | 9/2003 | Glerum et al. ............. 714/38.11 |
| 6,681,348 | B1 * | 1/2004 | Vachon ............................. 714/45 |
| 6,785,848 | B1 * | 8/2004 | Glerum et al. ............. 714/38.11 |
| 7,685,575 | B1 * | 3/2010 | Fareed ........................... 717/131 |
| 7,694,183 | B2 * | 4/2010 | Prescott et al. ............. 714/38.11 |
| 7,783,932 | B1 * | 8/2010 | Eigen et al. ...................... 714/45 |
| 7,882,223 | B2 * | 2/2011 | Brahmavar ................... 709/224 |
| 8,245,085 | B2 * | 8/2012 | Ueba ............................... 714/45 |
| 8,260,871 | B2 * | 9/2012 | Fallen et al. .................. 709/207 |

FOREIGN PATENT DOCUMENTS

| JP | 3-34036 A | 2/1991 |
| JP | 5-151117 A | 6/1993 |
| JP | 2003-30011 A | 1/2003 |
| JP | 2009-176146 A | 8/2009 |

OTHER PUBLICATIONS

Japanese Office Action mailed Sep. 3, 2013 for corresponding Japanese Application No. 2009-226767, with Partial English-language Translation.

* cited by examiner

*Primary Examiner* — Christopher McCarthy
(74) *Attorney, Agent, or Firm* — Fujitsu Patent Center

(57) ABSTRACT

An information processing apparatus includes a processing device and a management device managing the processing device, wherein the processing device includes a first storage device for storing a first program, a first processor that executes the first program, detects an error occurring in the processing device, and extracts partial information which is part of information stored in the first storage device when the error is detected in the processing device through the execution of the first program, and a first control device that transmits the extracted partial information to the management device, and wherein the management device includes a second control device connected to the first control device and that receives the transmitted partial information from the processing device; and a second storage device that stores the received partial information.

6 Claims, 11 Drawing Sheets

FIG. 6

| PATTERN | MASTER CAUSE INFORMATION | COLLECTED INFORMATION LIST |
|---|---|---|
| 1 | HARDWARE FAULT | MASTER CAUSE INFORMATION<br>STACK INFORMATION OF MAIN OS<br>REGISTER INFORMATION OF MAIN PROCESSOR<br>REGISTER INFORMATION OF I/O DEVICE |
| 2 | ERROR OCCURRING IN OS | MASTER CAUSE INFORMATION<br>STACK INFORMATION OF MAIN OS<br>REGISTER INFORMATION OF MAIN PROCESSOR |
| 3 | ERROR OCCURRING IN MAIN CONTROLLER | MASTER CAUSE INFORMATION<br>STACK INFORMATION OF MAIN OS<br>REGISTER INFORMATION OF MAIN PROCESSOR<br>REGISTER INFORMATION OF MAIN CONTROLLER |

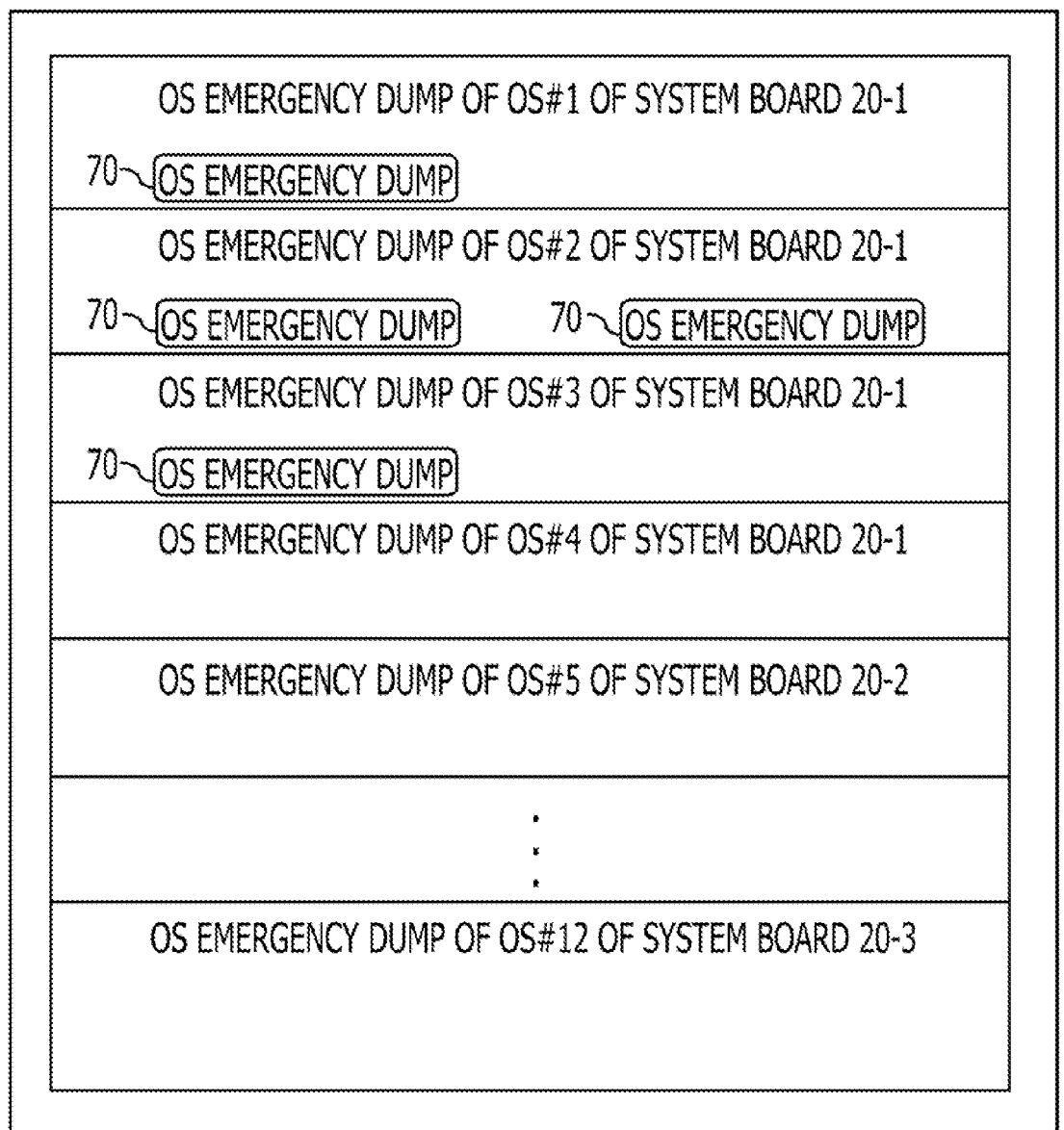

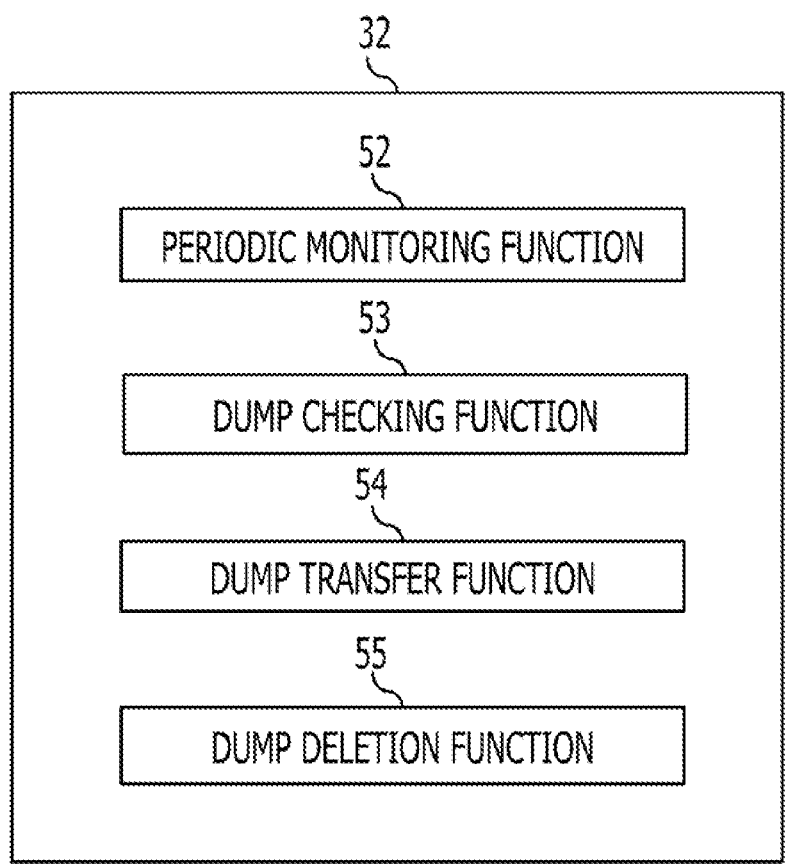

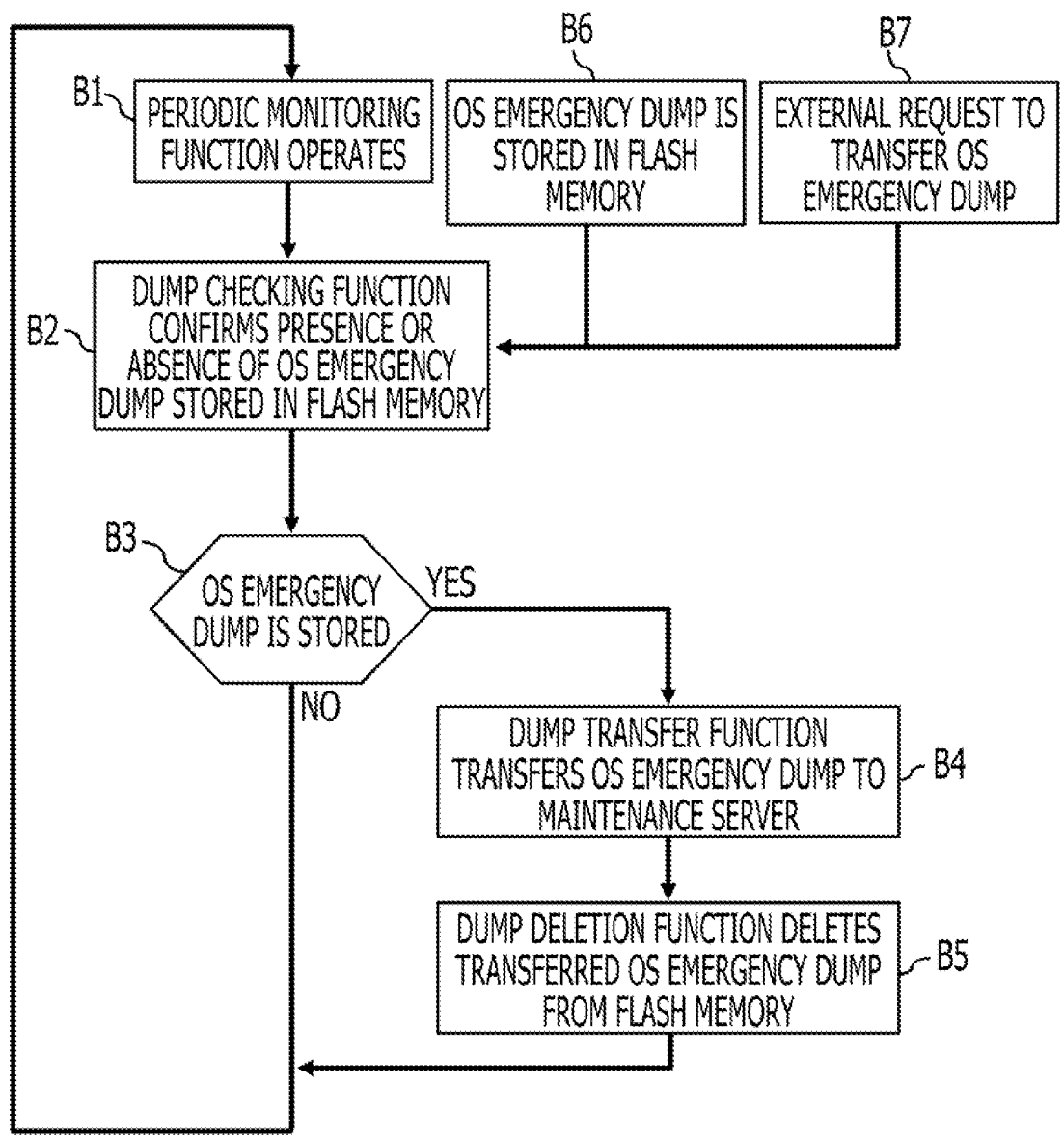

INFORMATION PROCESSING APPARATUS, METHOD OF CONTROLLING INFORMATION PROCESSING APPARATUS, AND CONTROL PROGRAM

CROSS-REFERENCE TO RELATED APPLICATION

This application is based upon and claims priority to prior Japanese Patent Application No. 2009-226767 filed on Sep. 30, 2009, in the Japan Patent Office, the entire contents of which are incorporated herein by reference.

FIELD

An embodiment of the present invention relates to an information processing apparatus, a method of controlling the information processing apparatus, and a control program.

BACKGROUND

For example, some server systems (information processing apparatuses) that are used to perform business operations include a main system used to perform business operations and an independent sub-system used to perform operations different from the business operations. In the above-described server systems, a main processor provided in the main system performs processing relating to ordinary business operations on an operating system (OS) installed in the main system which will often be referred to as a main OS. On the other hand, a sub-processor provided in the sub-system performs processing relating to the initial diagnostics, the fault monitoring, etc. for hardware on an OS installed in the sub-system (hereinafter often referred to as a sub-OS).

In the above-described server system, the main processor generates OS dump data (kernel dump data) based on the contents of a memory area used by the kernel or the processor information when a fault or a panic occurs in the main system. The generated OS dump data is stored in a disk device connected to the main system. The fault analysis is performed by referring to the OS dump data stored in the disk device as a storage device.

The technology of collecting and recording memory dump data obtained when the system fault occurs on a disk shared among many nodes in a cluster system including the many nodes has been perceived as a method of collecting the OS dump data.

[Patent Document 1] Japanese Laid-open Patent Publication No. 2003-30011

SUMMARY

According to an aspect of the invention, an information processing apparatus includes a processing device and a management device managing the processing device, wherein the processing device includes a first storage device for storing a first program, a first processor that executes the first program, detects an error occurring in the processing device, and extracts partial information which is part of information stored in the first storage device when the error is detected in the processing device through the execution of the first program, and a first control device that transmits the extracted partial information to the management device, and wherein the management device includes a second control device connected to the first control device and that receives the transmitted partial information from the processing device; and a second storage device that stores the received partial information.

BRIEF DESCRIPTION OF THE DRAWINGS

FIG. 6 illustrates exemplary dump generation patterns of OS emergency dump data provided in an information processing apparatus according to an embodiment;

FIG. 7 schematically illustrates an exemplary storage state of each of OS emergency dump data items that are provided in a flash memory provided in an information processing apparatus according to an embodiment;

FIG. 10 schematically illustrates an exemplary configuration of functions of a sub-processor provided in an information processing apparatus according to an embodiment; and FIG. 11 is a flowchart illustrating how OS emergency dump data is transferred to a maintenance server in an information processing apparatus according to an embodiment.

DESCRIPTION OF EMBODIMENTS

Figure 1:
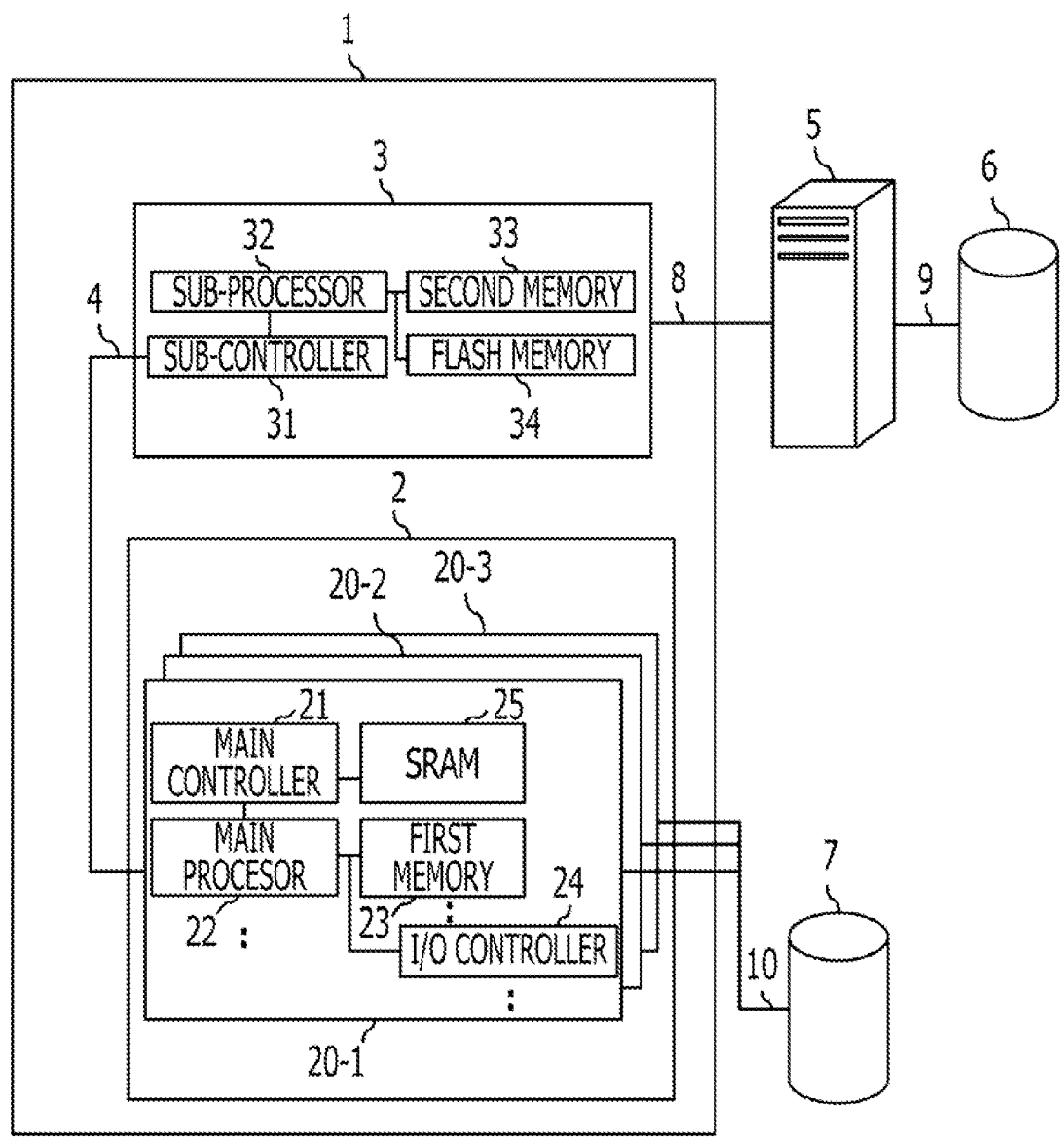
FIG. 1 schematically illustrates an exemplary configuration of an information processing apparatus according to an embodiment.
Figure 2:
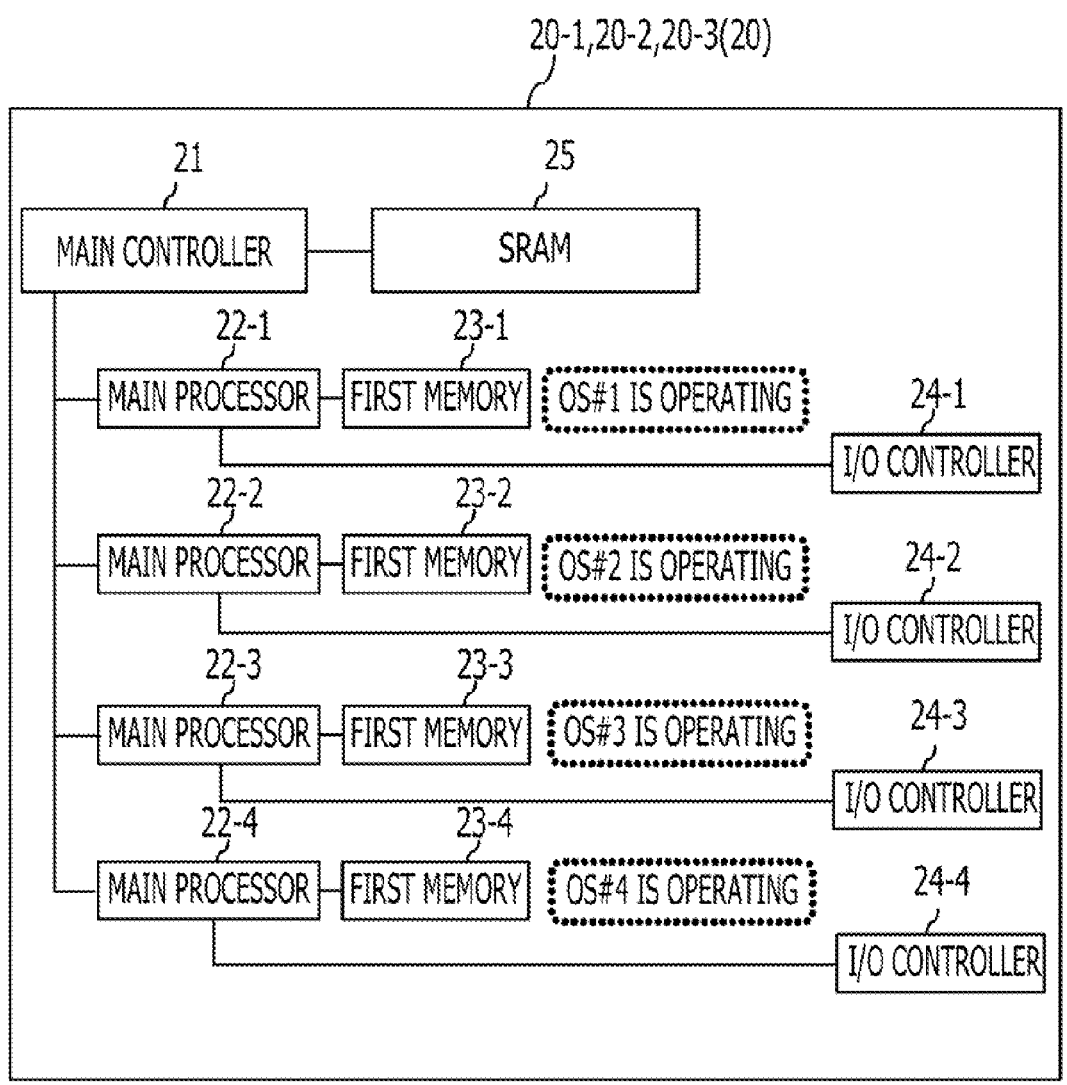
FIG. 2 schematically illustrates an exemplary detailed configuration of a system board provided in the information processing apparatus.

Hereinafter, an information processing apparatus, a method of controlling the information processing apparatus, and a control program according to an embodiment will be described with reference to the attached drawings. FIG. 1 schematically illustrates an exemplary configuration of an information processing apparatus 1 according to an embodiment and FIG. 2 schematically illustrates a detailed configuration of the system board of the information processing apparatus.

The information processing apparatus 1 illustrated in FIG. 1 includes a main system 2, a sub system 3, and a maintenance bus 4. The main system 2 is provided to perform main calculation services and includes system boards 20-1, 20-2, and 20-3. In the above-described embodiment, the main system 2 includes the three system boards 20-1 to 20-3, however, the main system 2 may include two or fewer system boards, or four system boards or more.

Hereinafter, reference numerals 20-1 to 20-3 are used to specify one of a plurality of system boards. However, a reference numeral 20 is used to specify an arbitrary system board. As illustrated in FIGS. 1 and 2, each of system boards 20 includes a main controller 21, main processors 22-1, 22-2, 22-3, and 22-4, first memories 23-1, 23-2, 23-3, and 23-4, input output (I/O) controllers 24-1, 24-2, 24-3, and 24-4, and a static random access memory (SRAM) 25. The main controller 21 is connected to the SRAM 25 and a plurality of (four in the above-described embodiment) the main processors 22-1 to 22-4. The main processor 22-1 is connected to the first memory 23-1 and the I/O controller 24-1. The main processor 22-2 is connected to the first memory 23-2 and the I/O controller 24-2. The main processor 22-3 is connected to the first memory 23-3 and the I/O controller 24-3. The main processor 22-4 is connected to the first memory 23-4 and the I/O controller 24-4. Further, each of the system boards 20 is connected to a first disk device 7 via a first communication line 10.

The first disk device 7 is a disk device including, for example, a hard disk drive (HDD) functioning as a storage device storing operating system (OS) dump data 60 which will be described later. The first communication line 10 is a communication line provided based on Fibre Channel (FC), Serial Attached Small Computer System Interface (SCSI) abbreviated as SAS, Ethernet (registered trademark), and so forth. Hereinafter, even though reference numerals 22-1 to 22-4 are used to specify one of the plurality of main processors, a reference numeral 22 is used to specify an arbitrary main processor. Likewise, even though reference numerals 23-1 to 23-4 are used to specify one of the plurality of first memories, a reference numeral 23 is used to specify an arbitrary first memory. Likewise, even though reference numerals 24-1 to 24-4 are used to specify one of the plurality of I/O controllers, a reference numeral 24 is used to specify an arbitrary I/O controller.

In the above-described embodiment, the system board 20 includes the main processors 22-1 to 22-4, the first memories 23-1 to 23-4, and the I/O controllers 24-1 to 24-4. Namely, an example where the system board 20 includes the four main processors, the four first memories, and the four I/O controllers will be described. However, the number of each of the main processors, the first memories, and the I/O controllers that are provided in the system board 20 may be three or fewer, or five or more.

The main controller 21 is a hardware device achieved through, for example, a field programmable gate array (FPGA). The main controller 21 transfers (transmits) OS emergency dump data 70 (partial information which will be described in detail later) generated through the main processor 22 from the main processor 22 based on data of specification of the address and size of the OS emergency dump data 70 in the SRAM 25 and a request to transfer the OS emergency dump data 70, the data being transmitted from the main processor 22. Namely, the main controller 21 functions as a first control device configured to transmit the OS emergency dump data 70.

More specifically, the main controller 21 receives the data transmitted from the main processor 22 which will be described in detail later, where the data indicates the specification of the address and size of the OS emergency dump data 70 for transfer in the SRAM 25 and the request to transfer the OS emergency dump data 70. Upon receiving the request to transfer the OS emergency dump data 70 from the main processor 22, the main controller 21 transfers the OS emergency dump data 70 from the SRAM 25 to a sub-controller 31 via the maintenance bus 4, the sub-controller 31 and the maintenance bus 4 will be described later.

Further, the connection of the main controller 21 is achieved so that the main controller 21 may communicate with the sub-controller 31 via the maintenance bus 4. The first memory 23 is, for example, a dynamic random access memory (DRAM). Namely, the first memory 23 is a storage device storing various types of application programs including an OS that is a first program and a control program which will often be referred to as a main OS, data compression algorithms, and so forth that are executed through the main processor 22, and various types of data. That is to say, the first memory 23 functions as a first storage device storing the first program. Further, a plurality of the first memories 23 is provided for each of the main processors 22.

The I/O controller 24 is a control device that may be connected to various types of I/O devices including an FC card, an Ethernet card, and so forth for use. A plurality of the I/O controllers 24 is provided for each of the main processors 22. The SRAM 25 is a storage device that is accessible by the main processor 22 and that functions as a buffer configured to temporarily store the OS emergency dump data 70 which will be described later. That is to say, the SRAM 25 functions as a second storage device storing the OS emergency dump data 70.

The main processor 22 is a processor including a central processing unit (CPU) or the like. The main processor 22 realizes various types of functions by executing the OS or various types of application programs that are stored in the first memory 23 which will be described later. Further, an independent main OS operates on each of the main processors 22. As illustrated in FIG. 2, OSes #1, #2, #3, and #4 operate in each of the main processors 22-1, 22-2, 22-3, and 22-4 on the system board 20. Namely, in an example illustrated in FIG. 2, the four main processors 22 are provided on each of the system boards 20. According to the above-described embodiment where the three system boards 20 are provided, twelve main OSes including the OSes #1 to #12 operate in the main system 2.

Figure 3:
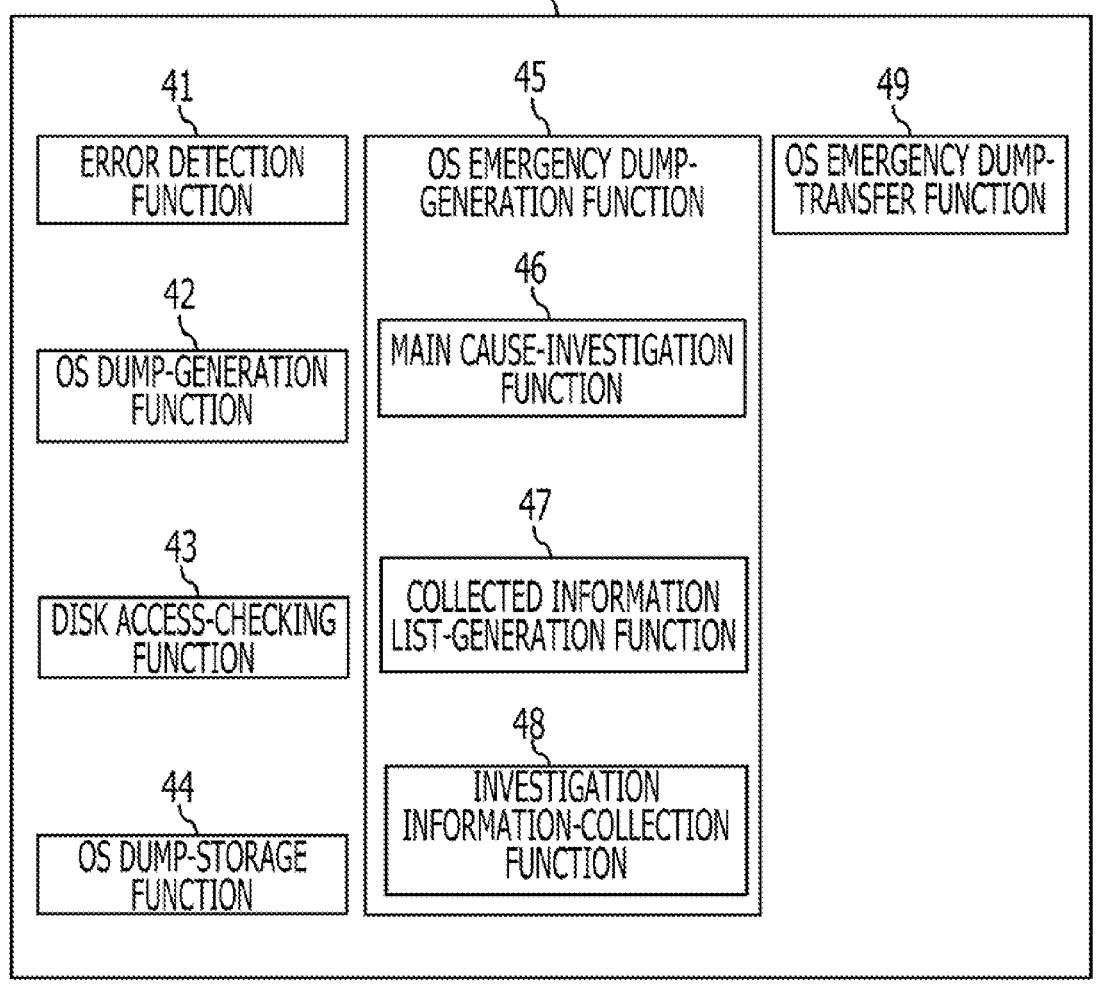
FIG. 3 schematically illustrates an exemplary configuration of functions of a main processor provided in an information processing apparatus according to an embodiment.

Each of the main processors 22 is connected to the main controller 21 via a local bus. Hereinafter, each of the same reference numerals as the above-described reference numerals indicates the same or approximately the same component. Therefore, the detailed description of each of the same reference numerals will be omitted. FIG. 3 schematically illustrates an exemplary functional configuration of the main processor 22. The main processor 22 executes an OS stored in the first memory 23 to achieve an error detection function 41, an OS dump-generation function 42, a disk access-checking function 43, an OS dump-storage function 44, an OS emergency dump-generation function 45 including a main cause-investigation function 46, a collected information list-generation function 47, and an investigation information-collection function 48, and an OS emergency dump-transfer function 49 that are illustrated in FIG. 3.

The error detection function 41 is provided to detect an error occurring in the main system 2. When a fault occurs in hardware, an interruption signal is transmitted from the above-described hardware to the main OS, for example. The error detection function 41 detects the error occurring in the main system 2 by detecting the above-described interruption signal. Further, when a fault occurs inside the OS, an error occurring in the main system 2 is detected through a self-diagnostic function provided in the main OS itself, for example. Still further, when a fault occurs in the main controller 21, an error occurring in the main system 2 is detected based on a problem occurring when the main OS reads the data of the main controller 21. Further, the OS dump-generation function 42 which will be described later is started upon being triggered by the error detection function 41 detecting the error occurring in the main system 2.

Figure 4:
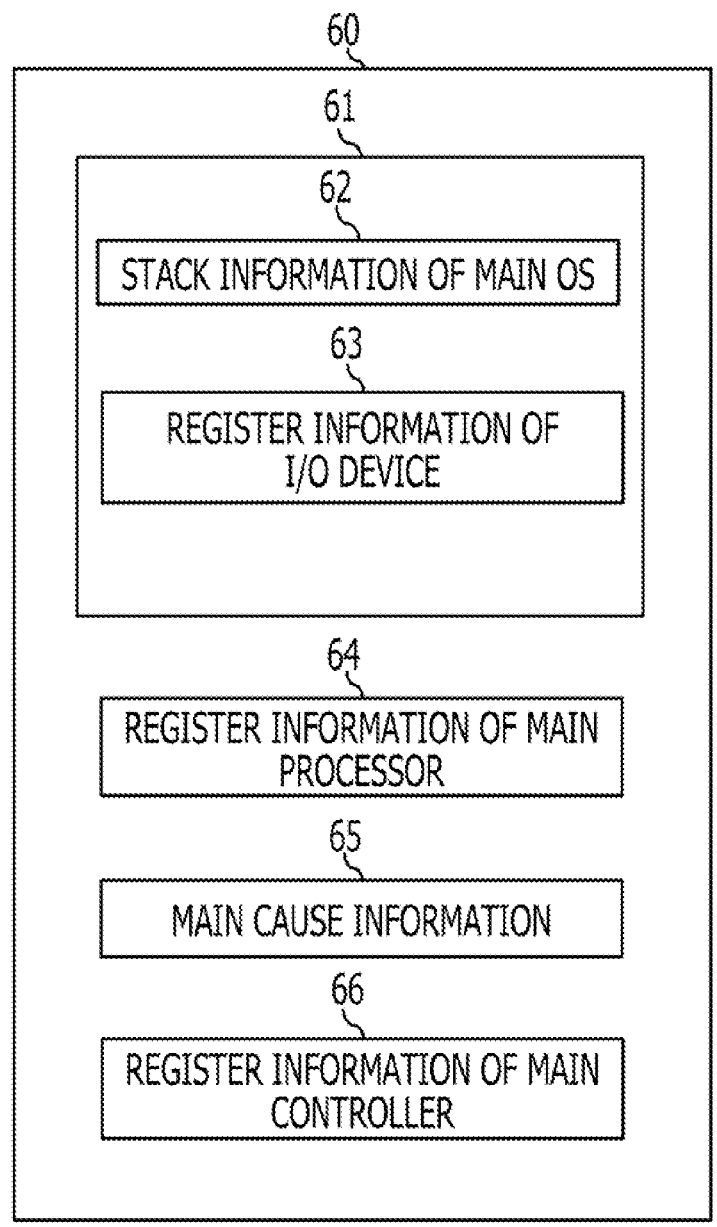
FIG. 4 schematically illustrates an exemplary configuration of OS dump data provided in an information processing apparatus according to an embodiment.

Further, the error detection function 41 has a function of monitoring and detecting an error occurring in the hardware or the like of the main system 2 at regular time intervals. Since the error detection function 41 may be achieved through various types of known methods, the detailed descriptions thereof will be omitted. The OS dump-generation function 42 collects information useful to analyze an error and generates OS dump data 60 upon being triggered by the error detection performed through the error detection function 41. The main processor 22 functions as a first processor achieving the above-described OS dump-generation function 42. FIG. 4 schematically illustrates an exemplary configuration of the OS dump data 60. The OS dump data 60 includes memory dump data 61 including stack information 62 of the main OS and register information 63 of the I/O device, register information 64 and main cause information 65 of the main processor, and register information 66 of the main controller that are obtained when the error occurred as illustrated in FIG. 4, for example.

The OS dump-generation function 42 generates the OS dump data 60 by collecting and combining the above-described memory dump data 61, the register information 64 and the main cause information 65 of the main processor, the register information 66 of the main controller when an error occurs in the main system 2. The generated OS dump data 60 is temporarily stored in the first memory 23, for example. Here, the memory dump data 61 is information stored in the first memory 23 when the error occurs. Further, the stack information 62 of the main OS is information about the operation state of the main OS, which is observed when the error occurs. For example, the stack information 62 is collected from 1 MByte of data continuing from the address 0x10000000 of the memory dump data 61. The register information 63 of the I/O device is register information obtained inside the I/O controller 24 or the I/O device when the error occurs. For example, the register information 63 is collected from 1 KByte of data continuing from the address 0x20000000 of the memory dump data 61 included in the OS dump data 60. Further, the register information 64 of the main processor is information collected from a register provided in the main processor 22 accessible by the main OS, such as a program counter provided in the main processor 22 when the error occurs. Further, the main cause information 65 is a kind of an error code determined based on the main cause of the occurred error. Here, the main cause of the error may be determined in the following manner. For example, an interruption signal is transmitted from the above-described hardware to the main OS when a fault occurs in the hardware. Therefore, it becomes possible to determine that the main cause of the error is the fault occurring in the hardware. Further, when a fault occurs inside an OS, the self-diagnosis function of the main OS itself detects a software error. Therefore, it becomes possible to determine that the main cause of the error is a fault occurring inside the OS in that case. Further, when a fault occurs in the main controller 21, it is determined that the fault is a problem occurring when the main OS reads data from the main controller 21. Therefore, the main cause of the error may be determined to be the fault occurring in the main controller 21.

An example of the fault occurring in the hardware may include the corruption of data stored in the first memory 23 used by the main OS or a fault occurring inside the main processor 22, such as a fault occurring in software, the fault being so moderate that the main OS may keep operating. An example of the fault occurring inside the OS may be a problem occurring due to a bug inside the software of the OS, that is, a software fault which is so moderate that the main OS may keep operating. An example of the fault occurring inside the main controller 21 may be a checksum error occurring in data stored in the main controller 21.

Then, an error code associated with the main factors of the above-described various errors is used as the main cause information 65. Further, the register information 66 of the main controller is collected from a fault-main cause register provided in the main controller 21. For example, the fault-main cause register stores history data indicating what types of commands including a command for monitoring a fault occurring in the main system 2, a command for starting the main system 2, and so forth have been used. Further, the fault-main cause register stores information about data transferred to the sub-system 3, information about a set value of the main controller 21, the set value being used at the fault occurrence time, and so forth.

In the above-described embodiment, the stack information 62 of the main OS and the register information 63 of the I/O device are included in the memory dump data 61. However, the memory dump data 61 may not be limited to the stack information 62 of the main OS and the register information 63 of the I/O device. Further, the stack information 62 of the main OS and the register information 63 of the I/O device may not be included in the memory dump data 61. Still further, the memory dump data 61 may include information other than the above-described stack information 62 and register information 63.

The disk access-checking function 43 is provided to confirm the possibility of making access to the first disk device 7. That is to say, a fault of some kind occurring in the first communication line 10 or an interface provided between the system board 20 and the first disk device 7 or a fault occurring in the first disk device 7 itself is detected as a disk access error. For example, it is determined that the disk access error occurs when the disk access is made a plurality of times and each of the disk accesses ends in failure.

Figure 5:
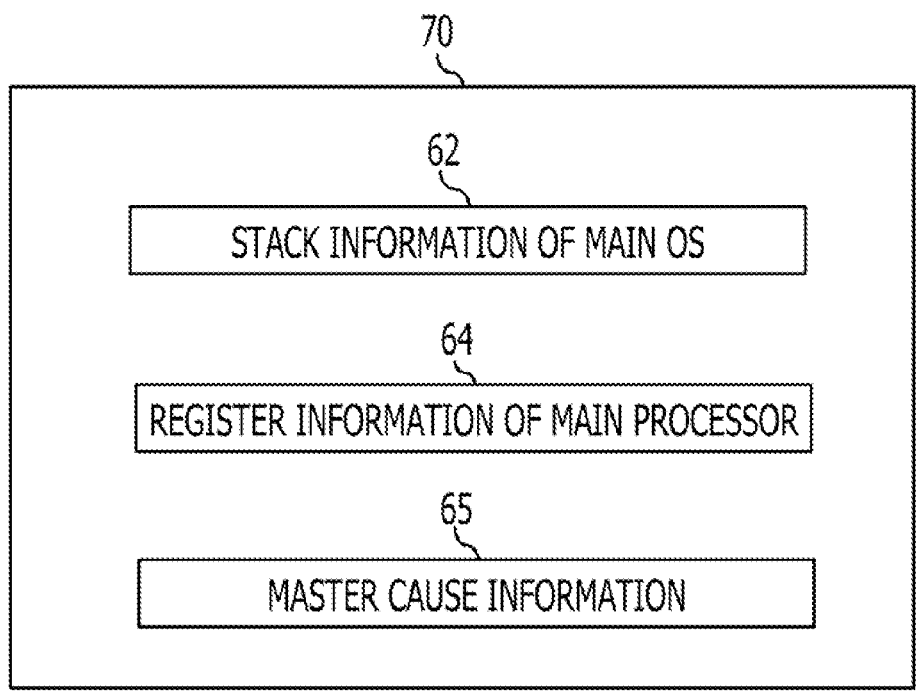
FIG. 5 schematically illustrates an exemplary configuration of OS emergency dump data provided in an information processing apparatus according to an embodiment.

The OS dump-storage function 44 stores the OS dump data 60 generated through the OS dump-generation function 42 in the first disk device 7 when the disk access-checking function 43 detects no disk access error. The OS emergency dump-generation function 45 generates the OS emergency dump data 70 having a capacity smaller than that of the OS dump data 60 by selecting specified information used to analyze an error from among the OS dump data 60 generated through the OS dump-generation function 42. The size of the OS emergency dump data 70 may be smaller than the size of the flash memory 34 provided as a non-volatile memory, for example. The OS emergency dump-generation function 45 includes the main cause-investigation function 46, the collected information-list-generation function 47, and the investigation information-collection function 48. FIG. 5 schematically illustrates an exemplary configuration of the OS emergency dump data. In an example illustrated in FIG. 5, the OS emergency dump data 70 includes the stack information 62 of the main OS, and the register information 64 and the main cause information 65 of the main processor that are obtained when the error occurs.

Further, there is a plurality of patterns of generating the OS emergency dump data 70 in accordance with the main cause information 65. The dump generation patterns are determined through the main cause-investigation function 46. When the disk access error is detected through the disk access-checking function 43, the main cause-investigation function 46 determines the dump generation pattern based on the main cause information 65. FIG. 6 illustrates the patterns of generating the OS emergency dump data. Namely, FIG. 6 illustrates the main cause information 65, the dump generation patterns, and the collected information list in association with one another.

The main cause-investigation function 46 determines the dump generation pattern to be a dump generation pattern 1 when the main cause information 65 indicates a hardware fault, a dump generation pattern 2 when the main cause information 65 indicates an error occurring in the OS, and a dump generation pattern 3 when the main cause information 65 indicates an error occurring in the main controller 21. Further, information including the main cause information, data of the dump generation patterns, and data of the collected information list that are associated with one another (data of the dump generation patterns) is stored in a storage device such as the first memory 23 in advance.

The collected information-list generation function 47 is provided to generate data of the list of information that is acquired as elements of the OS emergency dump data 70 through the investigation information-collection function 48 which will be described later based on the dump generation pattern specified through the main cause-investigation function 46 as illustrated in FIG. 7. In an example illustrated in FIG. 6, the collected information-list generation function 47 generates data of the collected information list illustrating the main cause information 65 obtained when the error occurs, the stack information 62 of the main OS, the register information 64 of the main processor, and the register information 63 of the I/O device as elements for collection when the hardware fault occurs (the dump generation pattern 1). Further, the collected information-list generation function 47 generates data of the collected information list illustrating the main cause information 65 obtained when the error occurs, the stack information 62 of the main OS, and the register information 64 of the main processor as elements for collection when an error occurs in the OS (the dump generation pattern 2). Still further, the collected information-list generation function 47 generates data of the collected information list illustrating the main cause information 65 obtained when the error occurs, the stack information 62 of the main OS, the register information 64 of the main processor, and the register information 66 of the main controller as elements for collection when an error occurs in the main controller 21 (the dump generation pattern 3).

The investigation information-collection function 48 is provided to collect information for collection from the OS dump data 60 generated through the OS dump-generation function 42 based on the collected information list data generated through the collected information list-generation function 47 and generates the OS emergency dump 70. More specifically, the investigation information-collection function 48 determines the address corresponding to information for collection (e.g., the head address) and the size of the information for collection, and collects the information from the OS dump data 60 that had already been generated and stored in a storage device such as the first memory 23. When the OS dump data 60 is generated, the main processor 22 recognizes the address and size of each of the stack information 62 of the main OS, the stack information 62 being obtained when the error occurs, the register information 63 of the I/O device, the register information 64 and the main cause information 65 of the main processor, the register information 66 of the main controller, and so forth that are included in the OS dump data 60.

Here, when the error occurs, the stack information 62 of the main OS being obtained is collected from 1 MByte data continuing from a specified position of the memory dump data 61 included in the OS dump data 60, such as the address 0x10000000. Here, when the error occurs, the register information 63 of the I/O device, the register information 63 being obtained is collected from 1 KByte data continuing from a specified position of the memory dump data 61 included in the OS dump data 60, such as the address 0x20000000. Reference is made to the address and the data size of other information including the register information 64 and the main cause information 65 of the main processor, which is obtained when the error occurs, and the register information 66 of the main controller, and the above-described other information is collected from the OS dump data 60.

In the above-described embodiment, the address and the data size is illustrated for convenience. Namely, the address and the data size may be changed in various ways. Further, the OS emergency dump-generation function 45 has a function of storing the generated OS emergency dump data 70 in the SRAM 25. The OS emergency dump-transfer function 49 performs processing to transfer the OS emergency dump data 70 to the sub-system 3 via the main controller 21. More specifically, the OS emergency dump-transfer function 49 specifies the address and the size of the OS emergency dump data 70 stored in the SRAM 25 for the main controller 21, and makes a request of the main controller 21 for execution of the transfer of the OS emergency dump data 70.

The sub-system 3 is a system including a service processor or the like, the system being provided to control the power-on and the shutdown of the main system 2, and monitor a fault occurring in the main system 2 via the maintenance bus 4. The sub-system 3 is configured as a system independent of the main system 2. Further, the sub-system 3 is connected to a maintenance server 5 which will be described later via a network 8 such as Ethernet (Registered Trademark). Further, the sub-system 3 includes the sub-controller 31, a sub-processor 32, the second memory 33, and the flash memory 34 as illustrated in FIG. 1.

The sub-controller 31 is a hardware device including the FPGA, for example. Upon receiving the OS emergency dump data 70 transferred from the main controller 21, the sub-controller 31 generates an interruption signal for the sub-processor 32. Namely, the sub-controller 31 functions as a second control device that is connected to the main controller 21 and that receives the OS emergency dump data 70. The second memory 33 is provided as a DRAM, for example. That is to say, the second memory 33 is a storage device storing data and various application programs including an OS executed by the sub-processor 32 (the second program which will be referred to as a sub-OS). Namely, the second memory 33 functions as a fourth storage device storing the second program.

The flash memory 34 is a kind of non-volatile memory configured to store various types of data. As illustrated in FIG. 7, the OS emergency dump data 70 which will be described later is stored in each of the main OSes provided in each of the system boards 20. Namely, the flash memory 34 functions as a second storage device. FIG. 7 illustrates the storage state of the OS emergency dump data 70 stored in the flash memory 34. In an example illustrated in FIG. 7, a storage area is formed in each of the main OSes and the OS emergency dump data 70 corresponding to each of the main OSes is stored in the individual storage areas. In the above-described embodiment, the number (hereinafter often referred to as generation) of the OS emergency dump data 70 stored in each of the main OSes in each of the system boards is two at the maximum. However, more than three units of the OS emergency dump data 70 may be stored in each of the main OSes.

The sub-processor 32 is a processor such as a CPU, and realizes various functions by executing various types of application programs including an OS stored in the memory 33. The sub-processor 32 achieves the dump storage function by executing an OS stored in the second memory 33. The above-described dump storage function is provided to store the OS emergency dump data 70 transmitted to the flash memory 34 via the sub-controller 31 when an interruption signal transmitted from the sub-controller 31 is triggered. Namely, the sub-processor 32 functions as a second processor. Further, the sub-processor 32 may be configured to perform a multi-thread operation.

The maintenance bus 4 is a point-to-point connection serial transfer bus configured to connect the main system 2 to the sub-system 3 in a communicable manner, for example. More specifically, the maintenance bus 4 is configured to connect the sub-system 3 to each of the system boards 20 in a communicable manner, the system boards 20 being included in the main system 2. The sub-system 3 determines the system board 20 included in the main system 2 to be the target and enables access to desired data via the above-described maintenance bus 4.

The maintenance server 5 is a server configured to maintain an information processing apparatus and is connected to a second disk device 6 via a second communication line 9. The second disk device 6 is a disk device provided as a storage device storing the OS emergency dump data 70. Exemplary operations of the above-described information processing apparatus 1 according to an embodiment will be described with reference to a flowchart (steps A0, A1, A2, A3, A4, A5, A6, A7, A8, A9, and A10) in FIG. 8.

First, the information processing apparatus 1 is started and the main processor 22 executes a first control program. When an error occurs in the main system 2 thereafter at step A0, the error detection function 41 detects the error occurring in the main system 2 at step A1. When the error detection function 41 detects the error occurring in the main system 2, the OS dump-generation function 42 collects information useful to analyze the error and generates the OS dump data 60 at step A2. The disk access-checking function 43 confirms whether there is a disk access-error to determine whether the OS dump data 60 generated at step A2 may be transferred to a first disk device 40 at step A3. When the confirmation result obtained at step A4 indicates the disk access-error, that is to say, when it is difficult to transfer the OS dump data 60 to the first disk device 40 (refer to No at step A4), the OS emergency dump-generation function 45 generates the OS emergency dump data 70 based on the OS dump data 60, and the OS emergency dump data 70 is stored in the SRAM 25 at step A5. When the OS emergency dump data 70 is generated at step A5, the OS emergency dump-transfer function 46 specifies the address and size of the OS emergency dump data 70 stored in the SRAM 25 for the main controller 21 at step A6. Further, the OS emergency dump-transfer function 46 transmits data of a request to transfer the OS emergency dump data 70 to the main controller 21 at step A7. Upon receiving the above-described request data, the main controller 21 transfers the OS emergency dump data 70 specified through the main processor 22 from the SRAM 25 to the sub-controller 31 at step A8. Upon receiving the OS emergency dump data 70, the sub-controller 31 generates an interruption signal for the sub-processor 32 at step A9. Upon receiving the interruption signal generated by the sub-controller 31, the sub-processor 32 transmits the OS emergency dump data 70 from the sub-controller 31 to the flash memory 34 through the dump storage function 51 to store the OS emergency dump data 70 in the flash memory 34 at step A10. Further, when no disk access error is detected, that is to say, when the OS dump data 60 may be transferred to the first disk device 7 (refer to Yes at step A4), the OS dump data 60 is transmitted from the SRAM 25 to the first disk device 7 through the OS dump storage function 44 so that the OS dump data 60 is stored in the first disk device 7 at step A10.

Figure 8:
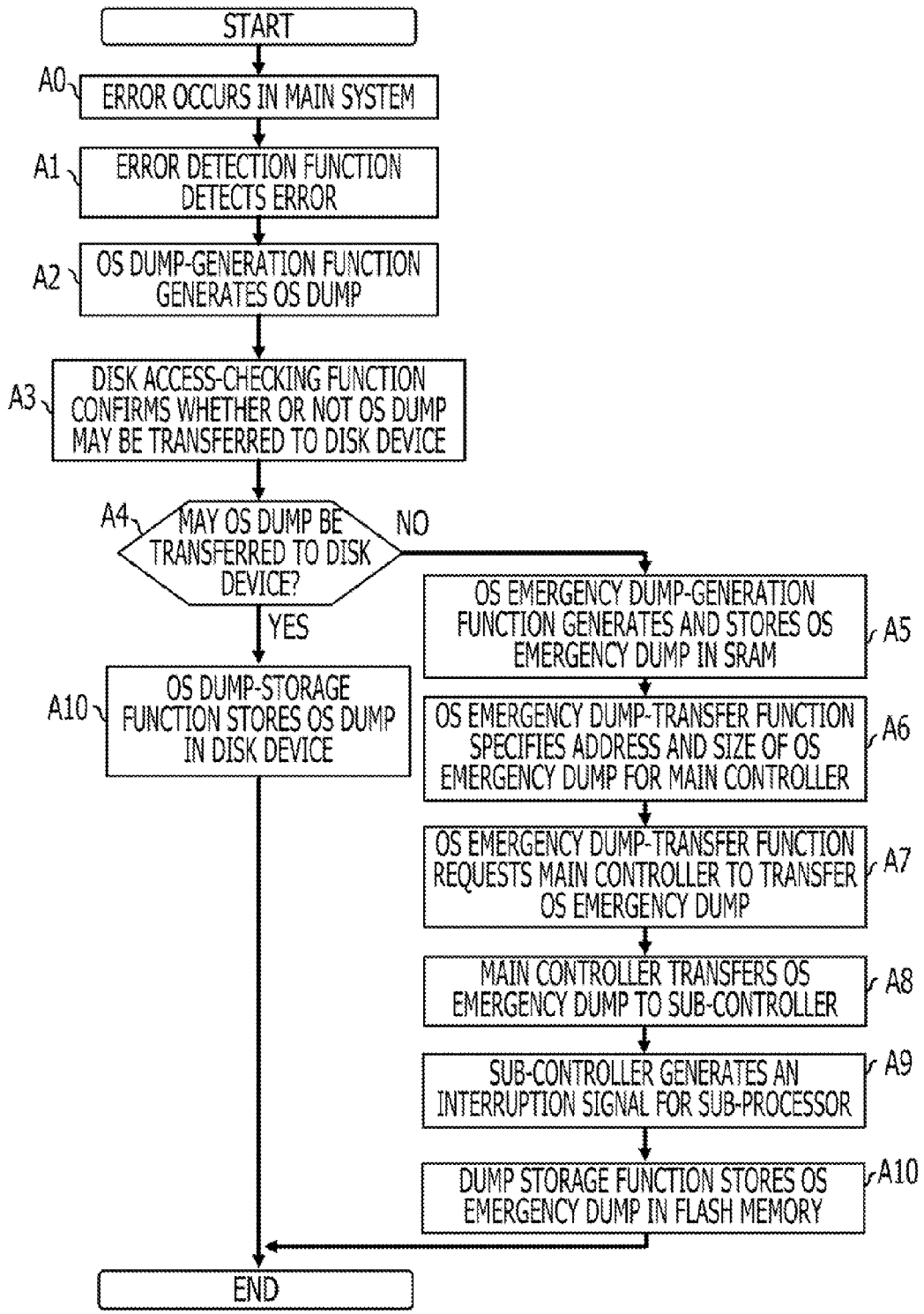
FIG. 8 is a flowchart illustrating processing procedures that are performed in an information processing apparatus according to an embodiment.
Figure 9:
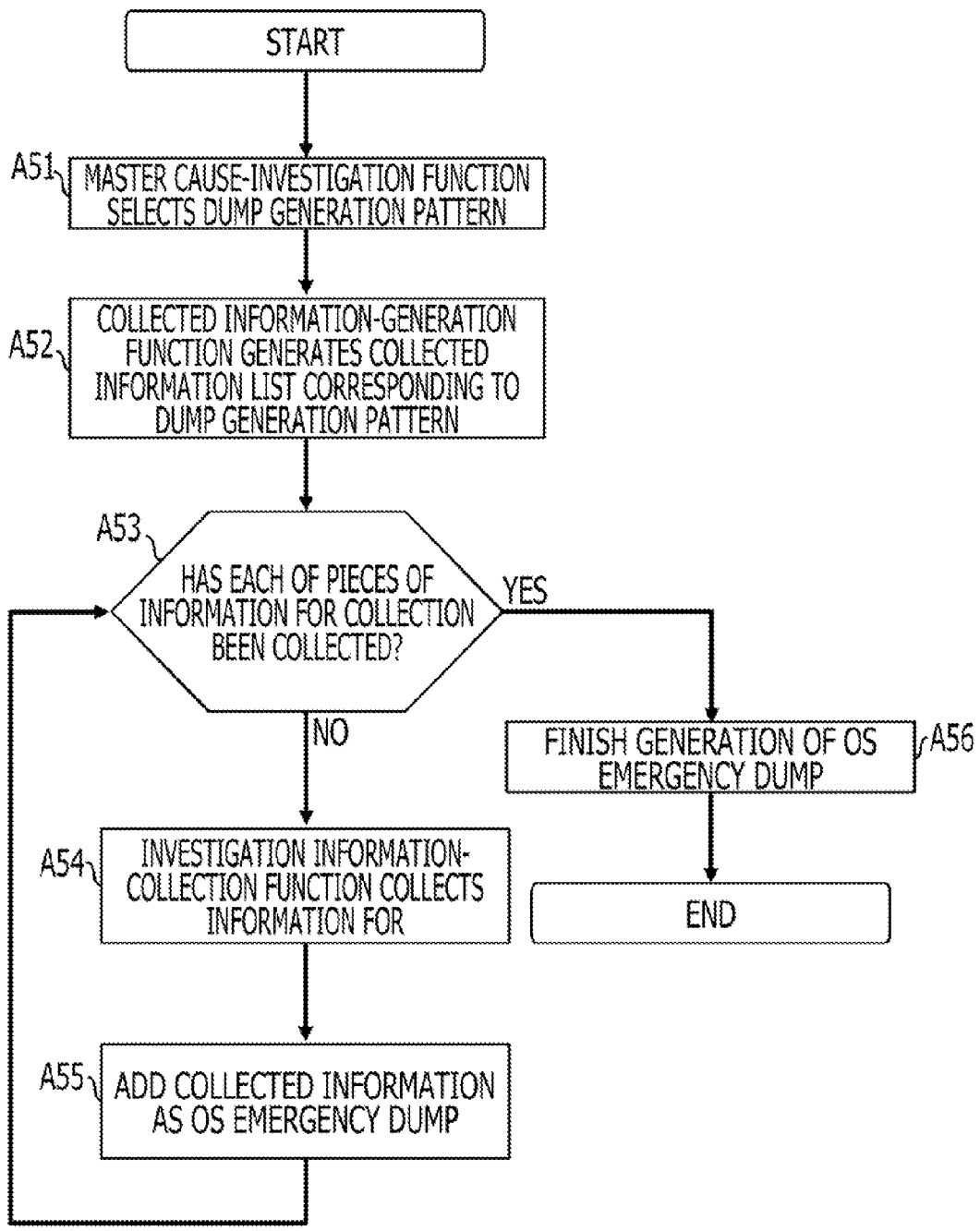
FIG. 9 is a flowchart illustrating how emergency dump data is generated in an information processing apparatus according to an embodiment.

Next, the details of the OS emergency dump-generation function 47, that is, operations performed at step A5 illustrated in FIG. 8 will be described in detail with reference to steps A51, A52, A53, A54, A55, and A56 that are depicted in a flowchart illustrated in FIG. 9. First, the main cause-investigation function 47 determines the dump generation pattern in accordance with the main cause information 65 based on the premise that the OS dump data 60 illustrated in FIG. 4 is generated at step A2 illustrated in FIG. 8. In the above-described embodiment as illustrated in FIG. 6, the collected information list-generation function 47 determines the dump generation pattern to be the pattern 1 when a fault occurs in the hardware, the pattern 2 when an error occurs in the OS, and the pattern 3 when an error occurs in the main controller, at step A51. As illustrated in FIG. 6, the collected information-list generation function 48 generates data of the list of information for collection based on the dump generation pattern determined by the main cause-investigation function 47 at step A52. The investigation information-collection function 49 determines whether the information for collection had already been collected based on the list data generated through the investigation information-list generation function 48 generating the OS emergency dump data 70 based on the OS dump data 60 already been generated at step A53. When the information for collection had not been collected (refer to No at step A53), the investigation information-collection function 49 collects the information items for collection from the OS dump data 60 in sequence based on the address and size of the information collected at step A54. The information collected at step A54 is added as the OS emergency dump data at step A55. When each of the information items for collection is collected based on the list data generated by the collected information-list generation function 48 (refer to Yes at step A53), the generation of the OS emergency dump data 70 is finished at step A56.

When errors occur in the main OSes that are provided on the same system board 20 at one time, each of the main OSes executed by the individual main processors 22 generates the OS emergency dump data 70, since the main OSes operate independently on the individual main processors 22. Each of the main processors 22 stores the generated OS emergency dump data 70 in the SRAM 25, and transmits data of a request to transfer the OS emergency dump data 70 to the main controller 21. Here, when the dump storage function of the sub-OS is implemented to perform parallel processing through the multi-thread operation or a multi-process operation and so forth, a plurality of units of OS emergency dump data transferred to the sub-controller 31 may be stored in the flash memory 34 at one time by the dump storage function.

Thus, even though it is difficult to transfer the OS dump data 60 to the first disk device 7 due to the disk access error, the information processing apparatus 1 according to an embodiment may generate and transfer the OS emergency dump data 70 to the sub-system 3 via the maintenance bus 4 provided for storage. Further, the storage of the OS emergency dump data 70 allows for analyzing a fault based on the stored OS emergency dump data 70.

Further, when it is difficult to transfer OS dump data to the first disk device 7 due to the disk access error, specified information useful to analyze a fault is selected from among the OS dump data 60 and the OS emergency dump data 70 is generated. Therefore, the capacity of the OS emergency dump data 70 becomes smaller than the size of the OS dump data 60. Consequently, it becomes possible to reliably store the OS emergency dump data 70 in the flash memory 34 with capacity smaller than the capacity of the first disk device 7.

Further, since the specified information useful to analyze a fault is selected from among the OS dump data 60 to generate the OS emergency dump 70, it becomes possible to analyze the fault with reliability. The sub-system 3 provided in the information processing apparatus 1 according to the embodiment may be connected to the maintenance server 5 connected to the second disk device 6 via a network.

The maintenance server 5 is a server provided to maintain the information processing apparatus 1. For example, the maintenance server 5 has a function of making a request to transfer the OS emergency dump data 70 stored in the flash memory 34 to the maintenance server 5 itself for maintenance. Further, the maintenance server 5 has a function of storing the OS emergency dump data transferred from the sub-system 3 in the second disk device 6. Namely, the maintenance server 5 functions as a management device.

The second disk device 6 is a disk device as a storage device storing OS emergency dump data, for example. Further, the second disk device 6 is connected to the maintenance server 5 via the second communication line 9 provided based on a widely used standard including the SCSI, the serial ATA (SATA), the network attached storage (NAS), and so forth. Namely, the second disk device 6 functions as a third storage device.

FIG. 10 schematically illustrates an exemplary configuration of functions of the sub-processor 32. The sub-processor 23 achieves a periodic monitoring function 52, a dump checking function 53, a dump transfer function 54, and a dump deletion function 55 that are illustrated in FIG. 10 in addition to the above-described dump storage function by executing an OS stored in the second memory 33. The dump checking function 53 is provided to determine whether the OS emergency dump data is stored in the flash memory 34. The dump checking function 53 operates upon being triggered by at least one of the execution of the periodic monitoring function 52 which will be described later, the storage of the OS emergency dump data 70 in the flash memory 34, and an external request to transfer the OS emergency dump data 70 is requested from the maintenance server 5, and so forth.

The periodic monitoring function 52 executes the dump checking function 53 at regular time intervals (e.g., one minute intervals). The periodic monitoring function 52 is achieved by a timer, for example. When it is determined that the OS emergency dump data 70 is stored in the flash memory 34 by the dump checking function 53, the dump transfer function 54 transfers the OS emergency dump data 70 stored in the flash memory 34 to the maintenance server 5.

The dump deletion function 55 deletes the OS emergency dump data 70 transferred from the flash memory 34 by the dump transfer function 54. Operations of the maintenance server 5, the second disk device 6, and the subsystem 2 that are provided in an information processing apparatus provided as an exemplary modification of the above-described embodiment will be described with reference to steps B1, B2, B3, B4, B5, B6, and B7 in a flowchart of FIG. 11. The processing procedures that are performed at steps A0 to A10 illustrated in FIG. 8 and steps A51 to A56 illustrated in FIG. 9 are the same as the above-described processing procedures.

First, the periodic monitoring function 52 executes the dump checking function 53 at regular time intervals at step B1. Accordingly, the dump checking function 53 determines whether the OS emergency dump 70 is stored in the flash memory 34 at step B2. If a result of the determination obtained at step B3 indicates that the OS emergency dump data 70 is stored in the flash memory 34 (refer to Yes at step B3), the dump transfer function 54 transfers the OS emergency dump data 70 stored in the flash memory 34 to the maintenance server 5 at step B4. The maintenance server 5 stores the transferred OS emergency dump data 70 in the second disk device 6. At step B5, when the transfer is finished, the dump deletion function 55 deletes the OS emergency dump data 70 that had already been transferred through the dump transfer function 54 from the flash memory 34 and the processing returns to step B1. Further, when it is determined that the OS emergency dump data 70 is not stored in the flash memory 34 (refer to No at step B3), the OS emergency dump data 70 is not transferred to the maintenance server 5 and the processing returns to step B1.

Further, when the OS emergency dump data 70 is transferred to the sub-controller 31 and stored in the flash memory 34 at step B6 or a request of transferring the OS emergency dump data 70 is transmitted from the maintenance server 5 or the like at step B7, the dump checking function 53 determines whether the OS emergency dump data is stored in the flash memory 34 at step B2. After the determination by the dump checking function 53, the processing procedures are performed as is the case with the above-described embodiment.

Here, the dump checking function 53 operates when the OS emergency dump data 70 is transferred from the main system 2 to the sub-system 3, and the dump transfer function 54 transfers the OS emergency dump data stored in the flash memory 34 to the maintenance server 5 in an example illustrated in FIG. 11. Then, the dump deletion function 55 deletes the OS emergency dump 70 which had already been transferred from the flash memory 34. Therefore, the number of the OS emergency dump data stored in the flash memory 34 becomes 0 in generally. However, when the transfer of the OS emergency dump data 70 to the maintenance server 5 ends in failure, that is to say, when the maintenance server 5 goes down and reboots during the transfer of the OS emergency dump data 70, for example, the OS emergency dump data 70 remains stored in the flash memory 34. In that case, the dump checking function 53 is executed by the periodic monitoring function 52 and the external request to transfer the OS emergency dump data 70 is requested from the maintenance server 5. Therefore, the OS emergency dump data 70 held in the flash memory 34 may be transferred to the maintenance server 5 with reliability.

Thus, the exemplary modification of the information processing apparatus 1 of the above-described embodiment may obtain the same operation effects as those of the above-described embodiment. Further, the OS emergency dump data 70 held in the sub-system 3 is transferred to the maintenance server 5 so that the transferred OS emergency dump data 70 is stored in the second disk device 6. Therefore, since the capacity of the second disk device 6 provided as a disk device is significantly larger than the capacity of a flash memory in generally, the storage amount of the OS emergency dump data 70 becomes larger than in the case of the first embodiment, for example.

Further, even though the transfer of the OS emergency dump data to the maintenance server 5 ends in failure, that is to say, even though the maintenance server 5 goes down and reboots during the transfer of the OS emergency dump data, for example, the dump checking function 53 is executed by the periodic monitoring function 52 and an external request to transfer the OS emergency dump data is requested from the maintenance server 5. Therefore, the OS emergency dump data held in the flash memory 34 may be transferred to the maintenance server 5 with reliability.

Further, various application programs including the main OS provided to achieve the functions of the main processor 22, the sub-OS provided to achieve the functions of the sub-processor 32, a compression algorithm, and so forth are stored in a computer readable recording medium and provided, where the computer readable recording medium includes a flexible disk, a CD (a CD-ROM, a CD-R, a CD-RW, etc.), a DVD (a DVD-ROM, a DVD-RAM, a DVD-R, a DVD+R, a DVD-RW, a DVD+RW, an HD DVD, etc.), a Blu-ray Disc™, a magnetic disk, an optical disk, a magneto-optical disk, and so forth. Then, a computer reads and transfers the program from the recording medium to an internal storage device or an external storage device so that the program is stored in the internal storage device or the external storage device for use. Further, the program may be stored in a storage device (recording medium) including the magnetic disk, the optical disk, the magneto-optical disk, etc., and transmitted from the storage device to the computer via a communication path.

Then, technologies that are disclosed in this specification may be modified in various ways within the scope of the spirit of the above-described embodiment and performed. In the above-described embodiment, for example, the OS emergency dump data 70 is generated, and stored in SRAM 25 as illustrated in the flowchart of FIG. 11. However, after the OS emergency dump data 70 is generated, the generated OS emergency dump data 70 may be compressed. Since the capacity of the OS emergency dump data 70 is reduced, a larger amount of the OS emergency dump data 70 may be stored in the flash memory 34 and the second disk device 6. The compression of the OS emergency dump data 70 is achieved through the main processor 22 executing the compression algorithm stored in the first memory 23, for example. Further, for analyzing the compressed OS emergency dump data 70, the compressed OS emergency dump data 70 is expanded through an expansion algorithm and the expanded OS emergency dump data 70 is analyzed.

Further, in the above-described embodiment, the OS emergency dump data 70 is stored in the flash memory 34 through the dump storage function of the sub-processor. However, the capacity of the flash memory 34 is often insufficient, which makes it difficult to store different OS emergency dump data 70. In that case, the dump transfer function 54 transfers OS emergency dump data that had already been stored in the flash memory 34 to the maintenance server 5 upon being triggered by the difficulty of storing the different OS emergency dump data 70. Then, the different OS emergency dump data 70 may be stored in the flash memory 34 after the transfer is done. Further, the storage of the different OS emergency dump data 70 may be refused and deleted.

Further, in the above-described embodiment, information is collected from the OS dump data 60 based on the address corresponding to the information for collection (e.g., the head address) and the size of the information for collection so that the OS emergency dump data 70 is generated. However, the information may be collected directly from various types of registers including a fault-main cause register provided in the main controller 21, as is the case where the OS dump data 60 is generated, for example. Namely, the stack information 62 of the main OS is collected from the 1 MByte data continuing from the address 0x10000000 of the memory dump data 61, and the register information 63 of the I/O device is collected from the 1 KByte data continuing from the address 0x20000000 of the memory dump data 61. Further, the register information 64 of the main processor is collected from a register provided in the main processor 22 accessible by the main OS. Further, the register information 66 of the main controller is collected from the fault-main cause register provided in the main controller 21. Further, the main cause information 65 is detected and recognized by the main OS itself.

Further, in the above-described embodiment, the presence or absence of the disk access error is confirmed after the OS dump data 60 is generated. If the confirmation result reveals the presence of the disk access error, the OS emergency dump data 70 is generated. However, it may be arranged that the presence or absence of the disk access error is confirmed without generating the OS dump data 60 and the OS dump data 60 is generated when there is no disk access error, and the OS emergency dump data 70 is generated when there is the disk access error. At that time, the information for collection of the OS emergency dump data 70 is collected not from the OS dump data 60, but directly from the various registers or the like as described above. Since the above-described arrangement allows for generating the OS emergency dump data 70 without generating the OS dump data 60, the processing is simplified.

Further, according the above-described embodiment, the OS dump-generation function 42 generates the OS dump data 60 when the disk access-checking function 43 detects the disk access error. However, the OS emergency dump-generation function 45 may generate the OS emergency dump data 70 without generating the OS dump data 60 after the detection of the disk access error. At that time, the information for collection for the OS emergency dump data 70 is collected not from the OS dump data 60, but directly from the various registers or the like as described above. Since the above-described configuration allows for generating the OS emergency dump data 70 without generating the OS dump data 60, the processing is simplified.

All examples and conditional language recited herein are intended for pedagogical objects to aid the reader in understanding the invention and the concepts contributed by the inventor to furthering the art, and are to be construed as being without limitation to such specifically recited examples and conditions. Although the embodiment(s) of the present inventions have been described in detail, it should be understood that the various changes, substitutions, and alterations could be made hereto without departing from the spirit and scope of the invention.

What is claimed is:

1. An information processing apparatus including a processing device and a management device managing the processing device, the processing device comprising:
a first storage device to store a first program;
a first processor to execute the first program, detect an error occurring in the first processor, and extract partial information which is part of information stored in the first storage device when the error is detected in the processing device through execution of the first program; and
a first control device to transmit the partial information to the management device, and the management device, connected to a maintenance device via a transfer path, comprising:
a second control device connected to the first control device to receive the partial information from the processing device;
a second storage device to store the partial information;
a third storage device to store the partial information;
a fourth storage device to store a second program; and
a second processor to transmit the partial information to the maintenance device by executing the second program, the second processor transmits the partial information when the second processor receives a data transfer request issued from the maintenance device, the maintenance device receives the partial information that is transmitted from the management device via the transfer path and stored in the second storage device, and stores the partial information in the third storage device.

2. The information processing apparatus according to claim 1,
wherein the first processor detects an error occurring in the processing device at regular time intervals through execution of the first program.

3. A method of controlling an information processing apparatus including a processing device and a management device managing the processing device, the method comprising:
executing a first program stored in a first storage device;
detecting an error occurring in a first processor provided in the processing device;
extracting partial information which is part of information stored in the first storage device by the first processor when the error occurring in the processing device is detected through execution of the first program;
transmitting the partial information by a first control device provided in the processing device;
receiving the partial information by a second control device included in the management device connected to the first control device; and
storing the partial information in a second storage device included in the management device,
the information processing apparatus is further connected to a maintenance device via a transfer path, and
the control method further comprises receiving the partial information that is transmitted from the management device via the transfer path and stored in the second storage device, and
storing the partial information in a third storage device,
the management device further comprises a fourth storage device to store a second program and a second processor to transmit the partial information to the maintenance device by executing the second program, and
the second processor transmits the partial information when the second processor receives a data transfer request issued from the maintenance device.

4. The method of controlling the information processing apparatus according to claim 3,
wherein the first processor detects an error occurring in the processing device at regular time intervals through the execution of the first program.

5. A non-transitory computer-readable medium storing a program for controlling an information processing apparatus including a processing device and a management device managing the processing device to execute a process, the process comprising:
executing a first program stored in a first storage device;
detecting an error occurring in a first processor that is included in the processing device and that is connected to the first storage device;
extracting partial information which is part of information stored in the first storage device through the first processor when the error occurring in the processing device is detected through execution of the program;
transmitting the partial information by a first control device provided in the processing device;
receiving the partial information by a second control device included in the management device connected to the first control device; and
storing the partial information in a second storage device included in the management device,
the information processing apparatus is further connected to a maintenance device via a transfer path, and
the control method further comprises receiving the partial information that is transmitted from the management device via the transfer path and stored in the second storage device, and
storing the partial information in a third storage device,
the management device further comprises a fourth storage device to store a second program and a second processor to transmit the partial information to the maintenance device by executing the second program, and
the second processor transmits the partial information when the second processor receives a data transfer request issued from the maintenance device.

6. The non-transitory computer-readable medium according to claim 5,
wherein the first processor detects the error occurring in the processing device at regular time intervals through the execution of the program.

* * * * *